US011040571B2

(12) United States Patent
Archambault et al.

(10) Patent No.: US 11,040,571 B2
(45) Date of Patent: Jun. 22, 2021

(54) SPACING BAR OF A WHEELCHAIR FRAME

(71) Applicant: MOTION COMPOSITES INC, Saint-Roch-de-l'Achigan (CA)

(72) Inventors: Michael Archambault, Saint-Roch-de-l'Achigan (CA); Alexandre Bleau, Lachenaie (CA); Pierre-Andre Couture, Laval (CA); Maxime Lamarre, Terrebonne (CA); David Gingras, L'Assomption (CA)

(73) Assignee: MOTION COMPOSITES INC., Saint-Roch-de-l'Achigan (CA)

( * ) Notice: Subject to any disclaimer, the term of this patent is extended or adjusted under 35 U.S.C. 154(b) by 278 days.

(21) Appl. No.: 16/081,302

(22) PCT Filed: Mar. 1, 2017

(86) PCT No.: PCT/CA2017/050275
§ 371 (c)(1),
(2) Date: Aug. 30, 2018

(87) PCT Pub. No.: WO2017/147704
PCT Pub. Date: Sep. 8, 2017

(65) Prior Publication Data
US 2019/0060143 A1 Feb. 28, 2019

Related U.S. Application Data

(60) Provisional application No. 62/310,036, filed on Mar. 18, 2016, provisional application No. 62/301,939, filed on Mar. 1, 2016.

(51) Int. Cl.
*B60B 33/00* (2006.01)
*A61G 5/10* (2006.01)
(Continued)

(52) U.S. Cl.
CPC ............ *B60B 33/0002* (2013.01); *A61G 5/10* (2013.01); *A61G 5/1056* (2013.01);
(Continued)

(58) Field of Classification Search
CPC . B60B 33/0002; B60B 33/0026; B60B 33/04; B60B 33/0065; B60B 33/0068;
(Continued)

(56) References Cited

U.S. PATENT DOCUMENTS

| | | | |
|---|---|---|---|
| 5,267,745 A | * | 12/1993 | Robertson ................. A61G 5/00 280/250.1 |
| 5,382,036 A | | 1/1995 | Counts et al. |

(Continued)

FOREIGN PATENT DOCUMENTS

| | | |
|---|---|---|
| CA | 2594566 A1 | 1/2009 |
| EP | 2213269 A1 | 8/2010 |
| EP | 2219582 B1 | 4/2012 |

*Primary Examiner* — Minnah L Seoh
*Assistant Examiner* — Marlon A Arce
(74) *Attorney, Agent, or Firm* — Norton Rose Fulbright Canada LLP

(57) ABSTRACT

A spacing bar of a wheelchair frame comprising an elongated structural body having a pair of opposite ends, each of the opposite ends having a C-shaped clamp configured for being clamped to respective lateral frame members of the wheelchair frame, wherein the elongated structural body and the C-shaped clamps are integrally made of a monocoque composite construction, and a tightening assembly for each of the C-shaped clamps, the tightening assemblies being arranged in the spacing bar to loosen and tighten the C-shaped clamps to the respective lateral frame members. A wheelchair frame comprising: a pair of lateral frame members configured to support at least a seat, and front and rear wheel units, the lateral frame members each having an elongated frame portion in a seating zone of the wheelchair frame, and a spacing bar having an elongated structural body (Continued)

and a pair of opposite ends, each of the opposite ends having a connector configured for being clamped to a respective one of the lateral frame member of the wheelchair frame, wherein each of the connectors forms a joint with the respective one of the elongated frame portions constraining the spacing bar to movement of the spacing bar axially along the pair of the elongated frame portion, a tightening assembly for each of the connectors, the tightening assemblies being arranged in the spacing bar to loosen and tighten the connectors to block or allow movement of the spacing bar along the pair of the lateral frame members.

21 Claims, 4 Drawing Sheets

(51) Int. Cl.
    *B60B 33/04*       (2006.01)
    *B60B 35/00*       (2006.01)
    *A61G 5/02*        (2006.01)
    *A61G 5/12*        (2006.01)

(52) U.S. Cl.
    CPC ........ *A61G 5/1097* (2016.11); *B60B 33/0026* (2013.01); *B60B 33/0065* (2013.01); *B60B 33/0068* (2013.01); *B60B 33/04* (2013.01); *A61G 5/02* (2013.01); *A61G 5/128* (2016.11); *B60B 33/0039* (2013.01); *B60B 33/0049* (2013.01); *B60B 33/0057* (2013.01); *B60B 35/009* (2013.01); *B60B 2200/22* (2013.01); *B60B 2200/26* (2013.01)

(58) Field of Classification Search
    CPC .............. B60B 35/009; B60B 2200/26; B60B 33/0039; B60B 33/0049; B60B 33/0057; B60B 2200/22; A61G 5/1056; A61G 5/1097; A61G 5/10; A61G 5/128; A61G 5/02; A61G 5/08
    See application file for complete search history.

(56) References Cited

U.S. PATENT DOCUMENTS

| | | | |
|---|---|---|---|
| 6,932,369 B2* | 8/2005 | Walsh | A61G 5/08 280/250.1 |
| 8,256,785 B2* | 9/2012 | Knopf | A61G 5/1054 280/250.1 |
| 2006/0087098 A1* | 4/2006 | Peterson | B60B 33/0007 280/304.1 |
| 2006/0191968 A1* | 8/2006 | Stapleton | B60R 9/04 224/325 |
| 2020/0000660 A1* | 1/2020 | Couture | A61G 5/0816 |

* cited by examiner

SPACING BAR OF A WHEELCHAIR FRAME

CROSS-REFERENCE TO RELATED APPLICATIONS

The present application claims priority on U.S. patent application Ser. No. 62/301,939, filed on Mar. 1, 2016, and on U.S. Patent Application Ser. No. 62/310,036, filed on Mar. 18, 2016, the content of both of which is inserted herein by reference.

TECHNICAL FIELD

The present application relates to wheelchairs and, more particularly, to various components of a wheelchair assembly.

BACKGROUND ART

Wheelchairs have evolved over the years to become increasingly ergonomic, lightweight, easy to maneuver and to use. However, there remains room for improvement to add additional adjustment possibilities to wheelchairs, and to render them even more convenient to use, notably in the maneuverability, stiffness, balance, but also for moving into or out of the wheelchair, and folding or unfolding the wheelchair for storage.

SUMMARY

It is an aim of the present disclosure to provide a wheelchair frame with spacing bar that rigidifies the wheelchair frame.

It is a further aim of the present disclosure to provide a spacing bar that is movable along the wheelchair frame to adjust a position thereof.

Therefore, in accordance with a first embodiment of the present disclosure, there is provided a spacing bar of a wheelchair frame comprising an elongated structural body having a pair of opposite ends, each of the opposite ends having a C-shaped clamp configured for being clamped to respective lateral frame members of the wheelchair frame, wherein the elongated structural body and the C-shaped clamps are integrally made of a monocoque composite construction, and a tightening assembly for each of the C-shaped clamps, the tightening assemblies being arranged in the spacing bar to loosen and tighten the C-shaped clamps to the respective lateral frame members.

Further in accordance with the first embodiment, in an instance, the tightening assemblies each include a threaded dowel pin.

Still further in accordance with the first embodiment, in an instance, the tightening assemblies each include a plurality of bolts for each said threaded dowel pin.

Still further in accordance with the first embodiment, in an instance, the threaded dowel pins are received in bores in the C-shaped clamps, the bores adapted to be parallel to portions of the lateral frame members to which the C-shaped claims are connected.

Still further in accordance with the first embodiment, in an instance, a slit is in a portion of each said C-shaped clamp, such that each said C-shaped clamp has two prongs.

Still further in accordance with the first embodiment, in an instance, the tightening assemblies comprise a bolt for each said prong.

Still further in accordance with the first embodiment, in an instance, fastener heads for fasteners of the tightening assemblies face upwardly when the spacing bar is mounted to the lateral frame members with a wheelchair on the ground, such that tool access to the fastener heads is from a top of the wheelchair.

Still further in accordance with the first embodiment, in an instance, the elongated structural body forms a concavity facing upwardly when the spacing bar is mounted to the lateral frame members with a wheelchair on the ground.

Still further in accordance with the first embodiment, in an instance, the elongated structural body has a generally straight segment between the opposite ends, the opposite ends being angled relative to the straight segment.

Still further in accordance with the first embodiment, in an instance, a native gap is defined by each said C-shaped clamp, the native gaps sized such that the C-shaped clamps remain in elastic deformation when tightened to the respective lateral frame members.

Still further in accordance with the first embodiment, in an instance, the C-shaped clamps are mirror images of one another.

In accordance with a second embodiment of the present disclosure, there is provided a wheelchair frame comprising: a pair of lateral frame members configured to support at least a seat, and front and rear wheel units, the lateral frame members each having an elongated frame portion in a seating zone of the wheelchair frame, and a spacing bar having an elongated structural body and a pair of opposite ends, each of the opposite ends having a connector configured for being clamped to a respective one of the lateral frame member of the wheelchair frame, wherein each of the connectors forms a joint with the respective one of the elongated frame portions constraining the spacing bar to movement of the spacing bar axially along the pair of the elongated frame portion, a tightening assembly for each of the connectors, the tightening assemblies being arranged in the spacing bar to loosen and tighten the connectors to block or allow movement of the spacing bar along the pair of the lateral frame members.

Further in accordance with the second embodiment, in an instance, the connectors at the opposite ends of the spacing bar are C-shaped clamps configured for being clamped to the lateral frame members of the wheelchair frame, wherein the elongated structural body and the C-shaped clamps are integrally made of a monocoque composite construction.

Still further in accordance with the second embodiment, in an instance, the tightening assemblies each include a threaded dowel pin.

Still further in accordance with the second embodiment, in an instance, the tightening assemblies each include a plurality of bolts for each said threaded dowel pin.

Still further in accordance with the second embodiment, in an instance, threaded dowel pins are received in bores in the C-shaped clamps, the bores adapted to be parallel to portions of the lateral frame members to which the C-shaped claims are connected.

Still further in accordance with the second embodiment, in an instance, a slit is in a portion of each said C-shaped clamp, such that each said C-shaped clamp has two prongs.

Still further in accordance with the second embodiment, in an instance, the tightening assemblies comprise a bolt for each said prong.

Still further in accordance with the second embodiment, in an instance, a native gap is defined by each said C-shaped clamp, the native gaps sized such that the C-shaped clamps remain in elastic deformation when tightened to the respective lateral frame members.

Still further in accordance with the second embodiment, in an instance, fastener heads for fasteners of the tightening assemblies face upwardly when the spacing bar is mounted to the lateral frame members with a wheelchair on the ground, such that tool access to the fastener heads is from a top of the wheelchair.

Still further in accordance with the second embodiment, in an instance, the elongated structural body forms a concavity facing upwardly when the spacing bar is mounted to the lateral frame members with a wheelchair on the ground.

Still further in accordance with the second embodiment, in an instance, the elongated structural body has a generally straight segment between the opposite ends, the opposite ends being angled relative to the straight segment.

Still further in accordance with the second embodiment, in an instance, the connectors are mirror images of one another.

BRIEF DESCRIPTION OF THE FIGURES

The present application relates to wheelchairs and, more particularly, to various components of a wheelchair assembly.

DETAILED DESCRIPTION

Figure 1:
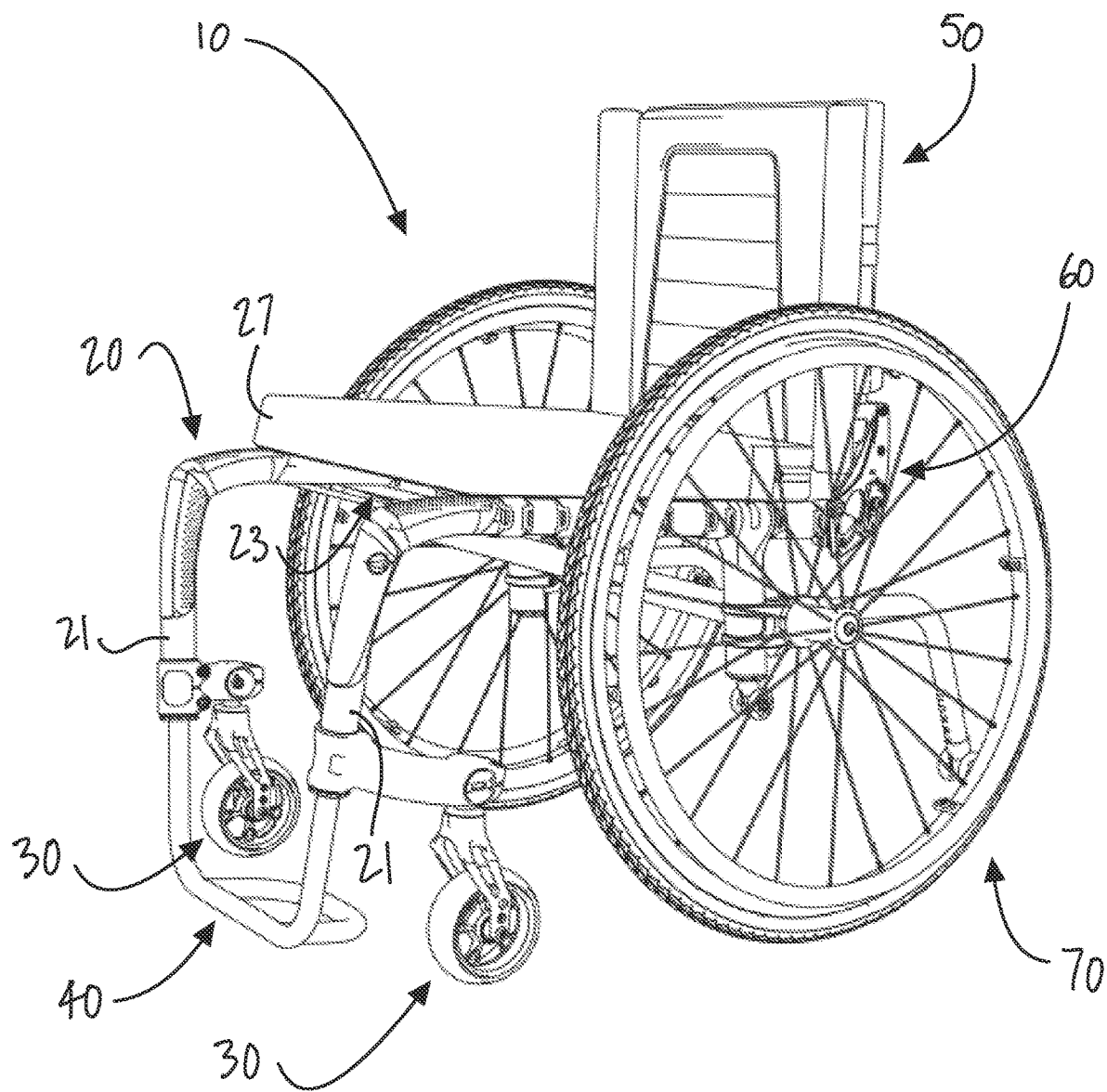
FIG. 1 is a perspective view of a wheelchair assembly in accordance with the present disclosure.
Figure 2:
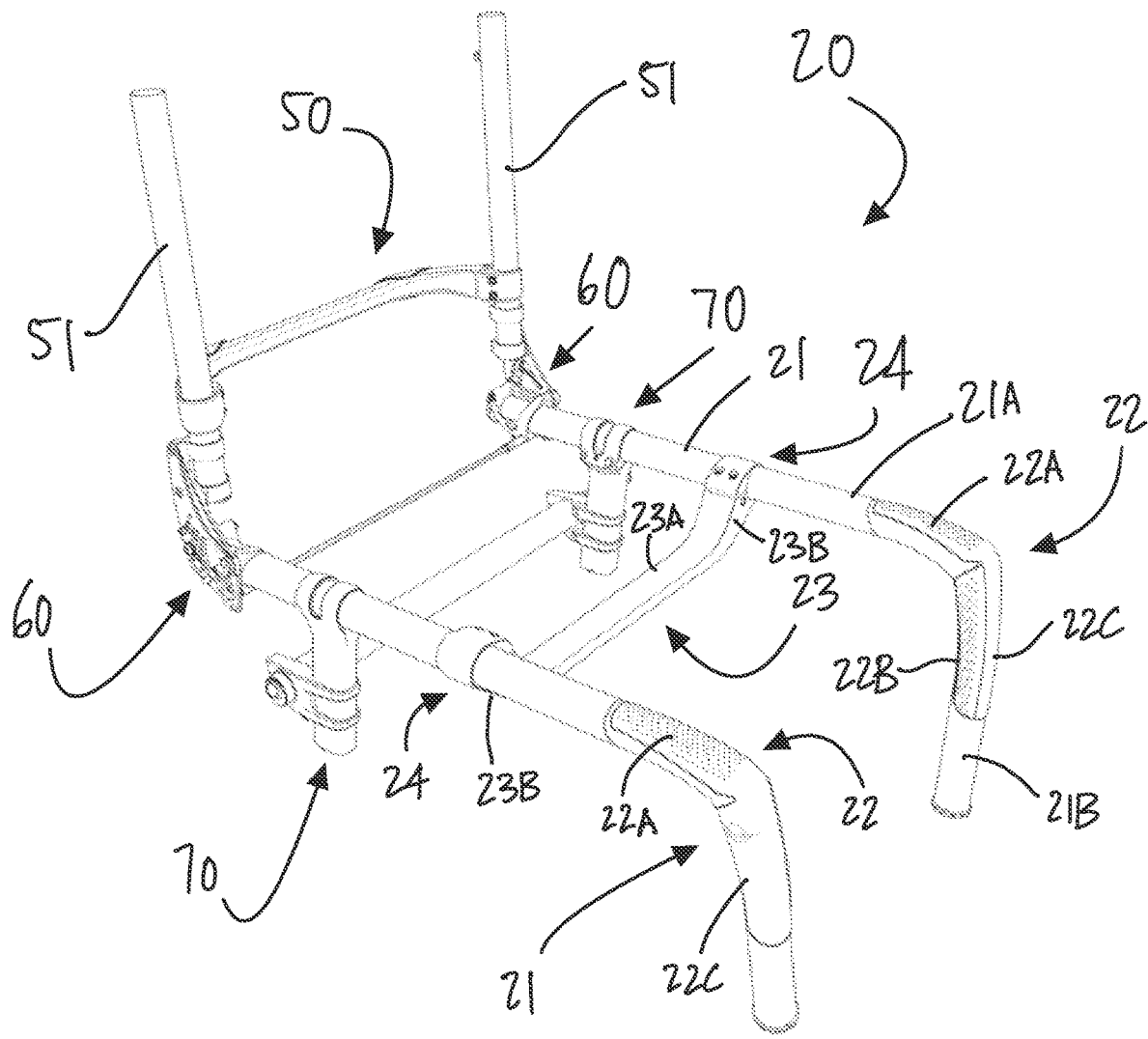
FIG. 2 is a perspective view of a wheelchair frame of the wheelchair assembly of FIG. 1.

Referring to the drawings and more particularly to FIGS. 1 and 2, there is illustrated a wheelchair assembly at 10, also simply referred to as wheelchair. The wheelchair assembly 10 is of the type having a plurality of other components, including a wheelchair frame 20, a pair of front wheel units 30, a footrest 40, a backrest frame 50, bracket assemblies 60 and rear wheel units 70.

The wheelchair frame 20 is shown in greater detail in FIG. 2. The wheelchair frame 20 forms the structure of the wheelchair assembly 20, as it may support the pair of front wheel units 30, a footrest 40, a backrest frame 50, bracket assemblies 60 and/or rear wheel units 70. The wheelchair frame 20 has a pair of lateral frame members 21, for instance in the form of tubes, a right-side tube and a left-side tube, for instance mirror images of one another. The tubes 21 may have an L-shape. The L-shape tube is one possible embodiment of the lateral frame members 21, and other shapes include a generally polygonal shape, a U-shape, etc, with or without tubes. Although the expression "L-shape" is used, the tube assemblies 21 may appear to be a L rotated by 90 degrees clockwise or counterclockwise, depending on the point of view of the observer of the wheelchair 10 of FIG. 1. Moreover, although a right-angle bend is shown in FIG. 1.

Referring to FIG. 2, the lateral frame members 21 may include tubes made in any appropriate material, such as carbon fiber, composites, metals (e.g., aluminum, titanium, steel, etc), and combinations thereof. According to an embodiment, the tubular member is a monolithic tube. The tubular member may have a first portion 21A and a second portion 21B. The first portion 21A may be an elongated frame member or tube generally horizontal when the wheelchair 10 is on its wheels, as in FIG. 1. The expression "generally horizontal" is well depicted in FIG. 1, in that the first portion 21A may or may not be substantially parallel to the ground. It is observed that the first portion 21A is in the seating zone of the wheelchair 10, and may even support a seat of the wheelchair 10, as described hereinafter. The first portion 21A may also support the bracket assemblies 60 and the rear wheel units 70. The second portion 21B is generally vertical or generally upright when the wheelchair 10 is on its wheels, as in FIG. 1. The expression "generally vertical" is also well depicted in FIG. 1, in that the second portion 21B may or may not be substantially perpendicular to the ground. The second portion 21B is in the bottom front zone of the wheelchair 10, and may also support the front wheel units 30 and the footrest 40, as described hereinafter.

Referring to FIG. 2, a corner of the L-shape tubes 21 may have an integral interface 22, seeing as the corner may come into contact with the legs and hands of a user of the wheelchair assembly 10. The integral interface 22 may have a gripping portion 22A, upon which a user's hands may rest. A padding portion 22B may be oriented inwardly, to offer padding against leg contact. A cover portion 22C covers a front and an outward side portion of the tube 21, and is typically made of TPU or like low-abrasion material. The cover portion 22C is a protective material against impacts, protecting the tubes 21 during manipulations of the flipped-down wheelchair assembly 10, or during normal use, as the tubes 21 protrude and may be exposed to contacts. The integral interface 22 may be connected to the tube 21 in any appropriate way. It is contemplated for instance to define a recess in the tube 21 to accommodate a portion of the integral interface 22 and hence form the continuous surface shown in FIG. 3. Other arrangements are considered as well.

Figure 3:
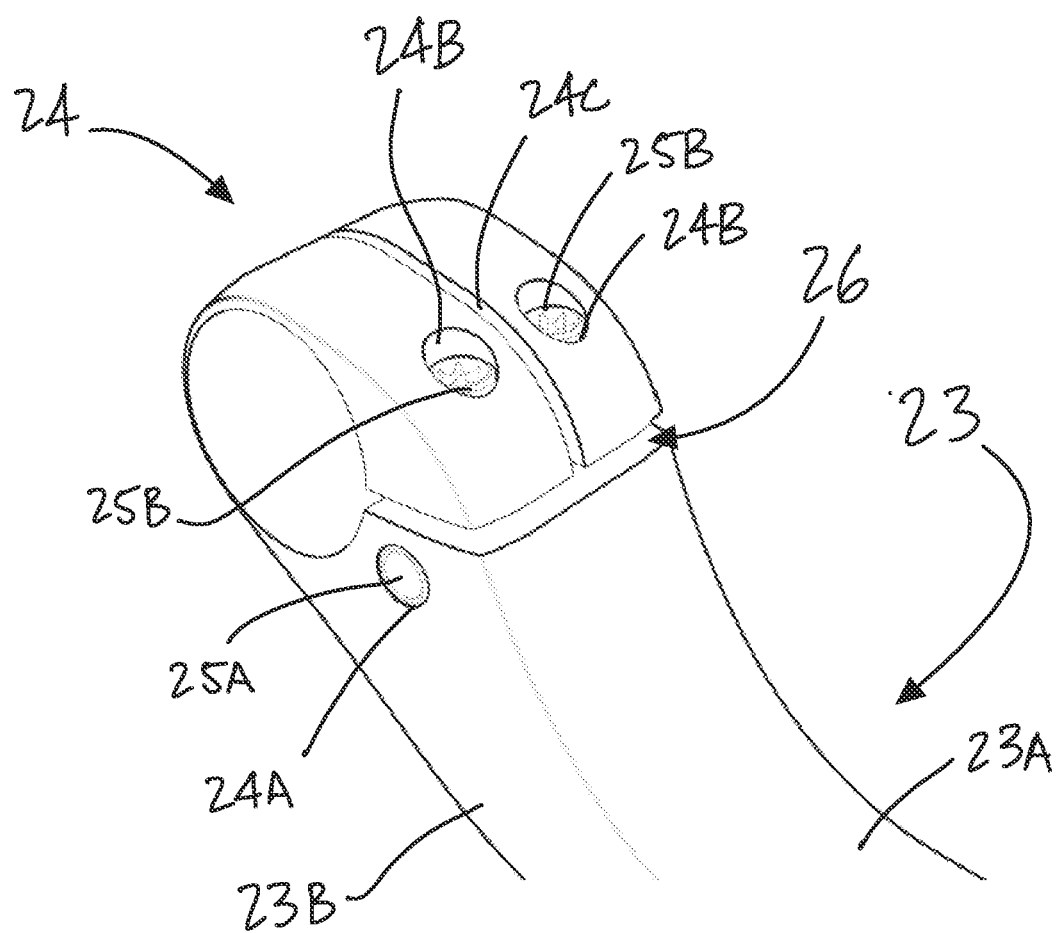
FIG. 3 is an enlarged end view of a spacing bar of the wheelchair frame of FIG. 2.
Figure 4:
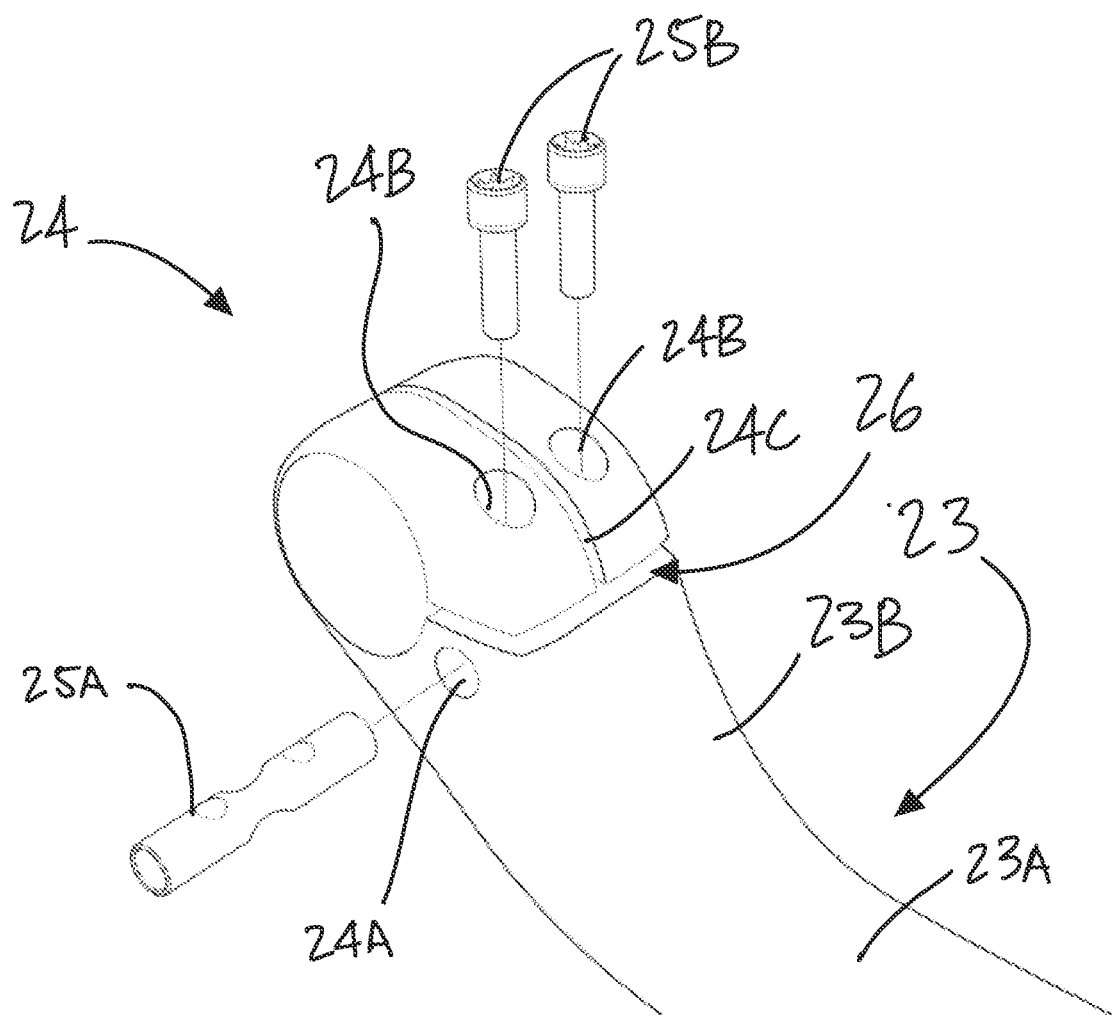
FIG. 4 is an assembly end view of the spacing bar of the wheelchair frame of FIG. 2.

Referring to FIGS. 2 to 4, the wheelchair frame 20 has a spacing bar 23, also referred to as cross member or rigidizer. As best shown in FIG. 2, the spacing bar 23 may have a straight segment 23A, with angled opposite ends 23B. As a result, the spacing bar 23 may generally form a concavity facing upwardly where a seat is to be attached to the lateral frame members 21, thereby defining a clearance between the seat and the spacing bar 23. An angle between the straight segment 23A and the opposite ends 23B may be between 15 degrees and 90 degrees from the straight segment 23A, to avoid contact if the opposite ends 23B with the seat 27 in the case of a seat sag. Moreover, the opposite ends 23B may be arcuate. The spacing member 23 is fixed at opposed ends to the first portion 21A of the tubes 21, by connectors 24. The spacing member 23 is a rigid structural component, and therefore preserves the distance between the tubes 21, and stiffens or rigidifies the wheelchair frame. Unlike other cross members enabling a lateral contraction of the wheelchair frame 20, the spacing bar 23 does not provide contraction capability to the wheelchair frame 20. The wheelchair frame 20 is also rigidified by components of the backrest frame 50, bracket assemblies 60, and/or rear wheel units 70, which operate concurrently with the spacing member 23 to limit movement between the tubes 21.

The connectors 24 have any appropriate mechanism to be secured to the lateral frame members 21, while forming a translation or sliding joint with the elongated frame portions 21A to enable an adjustment of position of the spacing bar 23 along the elongated frame portions of the lateral frame members 21. A translation or sliding joint in formed, in that the spacing bar 23 loosely connected to the lateral frame members 21 (i.e., not yet tightened) is constrained to translation movements, i.e., axial movement along the lateral frame members 21. The connectors 24 may be C-shaped clamps as in FIGS. 3 and 4, the C-shaped clamps configured for being clamped to the lateral frame member 21 of the wheelchair frame 10. According to an embodiment, the spacing bar 23 may be an elongated body with the C-shaped clamps 24 at the opposite ends of the elongated structural body being concurrently made of a monolithic composite construction (a.k.a., monoblock or monocoque), i.e., the spacing bar comes as a single piece out of molding. For example, the spacing bar 23 and connectors 24 may be made of a carbon fiber composite. The portion of the spacing bar 23 between the connectors 24 may be hollow (and thus tubular) if a bladder is used in the molding process. Alternatively, the spacing bar 23 may have a foam core, such as an EPS foam core, as a result of the use of the EPS as expandable member instead of a bladder.

The connectors 24 in the shape of a C-shaped clamp may include a transverse bore 24A and a pair of counterbores 24B. The expression transverse describes the fact that the bores 24A may be transverse to a longitudinal axis of the spacing bar 23, and parallel to the portions 21A. According to another embodiment, the C-shaped clamps 24 may have a central slit 24C to define two prongs for each of the C-shaped clamps 24. In such an arrangement, the connector 24 may provide two independent degrees of tightening at a same connector 24. However, it is contemplated to provide a single prong as well. Moreover, the connector 24 may have other embodiments in addition to the monocoque composite construction shown in the figures. For example, the connectors 24 may include a removable faceplate that may be secured to a U-shaped connector. The connectors 24 may also be mirror images of one another.

As shown in FIGS. 3 and 4, the connectors 24 have a tightening assembly, featuring a threaded dowel pin 25A (or any equivalent nut) and bolts 25B on opposite sides of a gap 26 of the C-shaped clamp 24. By screwing the bolts 25B into the dowel pin 25A integrated into the material of the connectors 24, the gap 26 is closed down to tighten the connectors 24 on the elongated frame portion 21A. The gap 26 may be a native gap, i.e., as molded) that may be sized such that the C-shaped clamps 23 remain in elastic deformation when tightened to the lateral frame members 21. Alternatively, the native gap 26 may be machined after the spacing bar 23 is molded as a monocoque block. According to an embodiment, the opening of the C-shaped clamps 24, receiving the first tube portion 21A, and gap 26 are machined from a molded solid block of the spacing bar 23.

The tightening assemblies are therefore arranged in the spacing bar 23 to loosen and tighten the C-shaped clamps 24. The dowel pin 25A may be received in the transverse bore 24A, with the bolts 25B received and retained by the counterbores 24B. In such an arrangement, the heads of the bolts 25B are oriented upwardly, to facilitate access to them with a tool such as an Allen Key or screwdriver. Other tightening mechanisms may be used, for instance, with nuts embedded in the spacing bar 23 as an alternative to the dowel pin 25A. Moreover, the threading may be directly in the material of the spacing bar 23 (or in the faceplate if any). However, the use of metallic components in the tightening mechanism, such as for the dowel pins 25A and bolts 25B, may increase the lifetime of these components, which may also be readily replaced if stripped.

The tightening mechanism described above advantageously allows a translation of the spacing bar 23 along the lateral frame members 21, when loosened. This enables an adjustment of the position of the spacing bar 23 along the lateral frame members 21. As the spacing bar 23 may be the structural component that is grasped when handling the flipped-down wheelchair, the spacing bar 23 may be strategically located to balance the weight of the flipped-down wheelchair to facilitate manipulations. The spacing bar 23 may for example be at a center of gravity of the flipped-down wheelchair.

The tubes 21 being spaced apart by the spacing bar 23 may hence support a seat 27 (FIG. 1). The seat 27 may be removably connected to the wheelchair frame 20. So as not to interfere with the seat 27, the spacing bar 23 may have the concave shape described above. Indeed, when a person sits on the seat 27 or applies pressure on the backrest, these items may sag. The concave shape reduces the risk of contact during the sagging. As for assembly, the spacing bar 23 may be mounted to the lateral frame members 21 before the bracket assemblies 60 and the rear wheel units 70, via the rear end of the elongated frame members of the lateral frame members 21. As shown in FIG. 1, the backrest frame 50 may have a pair of elongated members 51, such as tubes. A spacing bar 23 may be used to space the elongated members 51 while stiffening the assembly, as it does for the lateral frame members 21. The spacing bar 23 for the backrest frame 50 may be the same as for the seat frame 20, or may have similar proportions. The presence of the translational joints allows easy adjustment of the spacing bar 23, in that the spacing bar 23 may remain attached to the lateral frame members 21 while being loosened. Therefore, the spacing bar 23 maintains the spacing of the lateral frame members 21 even when loosened into forming the translational joint.

The invention claimed is:

1. A spacing bar of a wheelchair frame comprising an elongated structural body having a pair of opposite ends, each of the opposite ends having a C-shaped clamp configured for being clamped to respective lateral frame members of the wheelchair frame, wherein the elongated structural body and the C-shaped clamps are integrally made of a monocoque composite construction, and a tightening assembly for each of the C-shaped clamps, the tightening assemblies being arranged in the spacing bar to loosen and tighten the C-shaped clamps to the respective lateral frame members, wherein a native gap is defined by each said C-shaped clamp, the native gaps sized such that the C-shaped clamps remain in elastic deformation when tightened to the respective lateral frame members.

2. The spacing bar according to claim 1, wherein the tightening assemblies each include a threaded dowel pin.

3. The spacing bar according to claim 2, wherein the tightening assemblies each include a plurality of bolts for each said threaded dowel pin.

4. The spacing bar according to claim 2, wherein the threaded dowel pins are received in bores in the C-shaped clamps, the bores adapted to be parallel to portions of the lateral frame members to which the C-shaped claims are connected.

5. The spacing bar according to claim 1, further comprising a slit in a portion of each said C-shaped clamp, such that each said C-shaped clamp has two prongs.

6. The spacing bar according to claim 5, wherein the tightening assemblies comprise a bolt for each said prong.

7. The spacing bar according to claim 1, wherein fastener heads for fasteners of the tightening assemblies face upwardly when the spacing bar is mounted to the lateral frame members with a wheelchair on the ground, such that tool access to the fastener heads is from a top of the wheelchair.

8. The spacing bar according to claim 1, wherein the elongated structural body forms a concavity facing upwardly when the spacing bar is mounted to the lateral frame members with a wheelchair on the ground.

9. The spacing bar according to claim 8, wherein the elongated structural body has a generally straight segment between the opposite ends, the opposite ends being angled relative to the straight segment.

10. The spacing bar according to claim 1, wherein the C-shaped clamps are mirror images of one another.

11. A wheelchair frame comprising:
a pair of lateral frame members configured to support at least a seat, and front and rear wheel units, the lateral frame members each having an elongated frame portion in a seating zone of the wheelchair frame, and
a spacing bar having an elongated structural body and a pair of opposite ends, each of the opposite ends having a connector configured for being clamped to a respective one of the lateral frame member of the wheelchair frame, wherein each of the connectors forms a joint with the respective one of the elongated frame portions constraining the spacing bar to movement of the spacing bar axially along the pair of the elongated frame portion, a tightening assembly for each of the connectors, the tightening assemblies being arranged in the spacing bar to loosen and tighten the connectors to block or allow movement of the spacing bar along the pair of the lateral frame members, wherein the connectors at the opposite ends of the spacing bar are C-shaped clamps including a composite material, configured for being clamped to the lateral frame members of the wheelchair frame, the C-shaped clamps a native gap is defined by each said C-shaped clamp, the native gaps sized such that the C-shaped clamps remain in elastic deformation when tightened to the respective lateral frame members.

12. The wheelchair frame according to claim 11, wherein the elongated structural body and the C-shaped clamps are integrally made of a monocoque composite construction.

13. The wheelchair frame according to claim 12, wherein the tightening assemblies each include a threaded dowel pin.

14. The wheelchair frame according to claim 13, wherein the tightening assemblies each include a plurality of bolts for each said threaded dowel pin.

15. The wheelchair frame according to claim 13, wherein threaded dowel pins are received in bores in the C-shaped clamps, the bores adapted to be parallel to portions of the lateral frame members to which the C-shaped claims are connected.

16. The wheelchair frame according to claim 12, further comprising a slit in a portion of each said C-shaped clamp, such that each said C-shaped clamp has two prongs.

17. The wheelchair frame according to claim 16, wherein the tightening assemblies comprise a bolt for each said prong.

18. The wheelchair frame according to claim 11, wherein fastener heads for fasteners of the tightening assemblies face upwardly when the spacing bar is mounted to the lateral frame members with a wheelchair on the ground, such that tool access to the fastener heads is from a top of the wheelchair.

19. The wheelchair frame according to claim 11, wherein the elongated structural body forms a concavity facing upwardly when the spacing bar is mounted to the lateral frame members with a wheelchair on the ground.

20. The wheelchair frame according to claim 19, wherein the elongated structural body has a generally straight segment between the opposite ends, the opposite ends being angled relative to the straight segment.

21. The wheelchair frame according to claim 11, wherein the connectors are mirror images of one another.

* * * * *